UNITED STATES PATENT OFFICE.

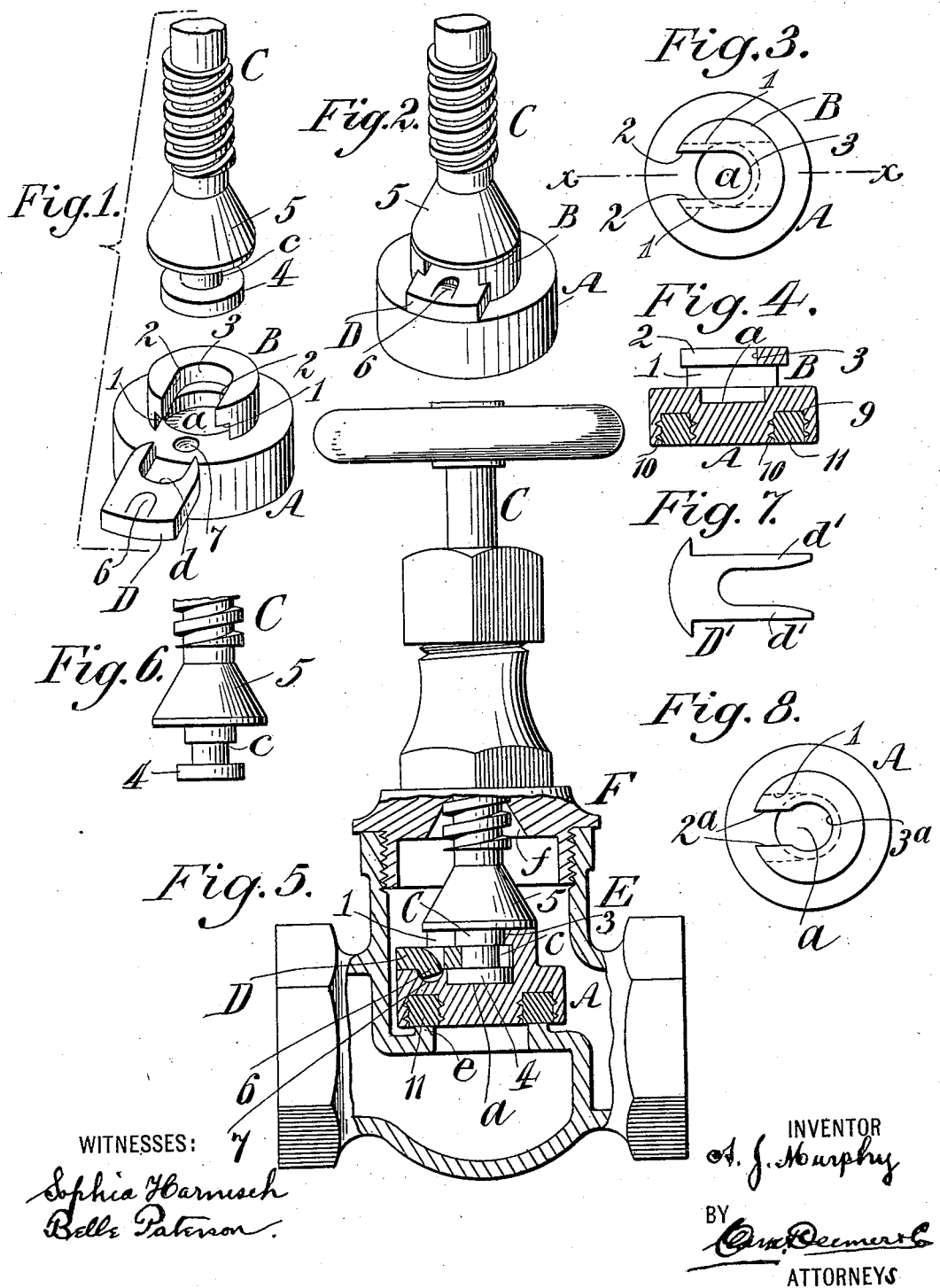

ANDREW JOHN MURPHY, OF NEW YORK, N. Y.

VALVE DEVICE.

SPECIFICATION forming part of Letters Patent No. 691,477, dated January 21, 1902.

Application filed May 29, 1901. Serial No. 62,337. (No model.)

*To all whom it may concern:*

Be it known that I, ANDREW JOHN MURPHY, a citizen of the United States, and a resident of New York, county of New York, and State of New York, have invented certain new and useful Improvements in Valve Devices, of which the following is a specification, reference being had to the accompanying drawings, forming a part thereof, in which similar characters of reference indicate corresponding parts.

This invention relates to an improved valve device embodying a screw-threaded valve-stem and a revoluble detachable disk valve, the object thereof being to provide an article of this character which is so constructed as to admit of readily detaching the disk valve from the stem for the purpose of repairing or renewing its seat portion, but which embodies novel features of construction adapted to prevent buckling of the valve, which is common to the removable valve devices now in use.

The device is simple in construction, durable, and operative, and by its use the expense of maintaining the valve in continuous effective working condition is reduced to a minimum.

The invention will be hereinafter fully described, and specifically set forth in the annexed claims.

In the accompanying drawings, forming part of this specification, Figure 1 is a perspective view of my improved device in its preferred form, showing the several parts disassembled; Fig. 2, a perspective view showing the parts assembled; Fig. 3, a plan view of the valve, illustrating a slight modification; Fig. 4, a cross-sectional elevation taken on a line $x\ x$ of Fig. 3; Fig. 5, a side elevation, partly in section, showing the device in connection with a globe-valve casing; Fig. 6, a perspective view illustrating the lower part of the valve-stem; Fig. 7, a plan view of a key or fastener to connect the parts of the device, and Fig. 8 is a plan view illustrating a slightly-modified disk valve.

In the practice of my invention in its preferred form I employ, primarily, a metallic disk A, having a cylindrical head B formed integral therewith and extended upwardly and centrally therefrom. Formed centrally within the upper surface of the disk A is a circular recess $a$, which communicates with the inner periphery of the cylindrical head B and is of a diameter equal thereto. Leading through the side of the head B, above this said recess and preferably of a width equal to the diameter thereof, is a slot 1. Formed in the upper surface of the cylindrical head B, parallel with the slot 1, is a recess having its side walls 2 extended tangentially from a semicircular shoulder 3, which is concentric with the recess $a$ and of a diameter equal to the diameter of the valve-stem C, as shown by Fig. 3 of the drawings, or the side walls, as $2^a$, Fig. 8 of the drawings, may extend from the segmental shoulder $3^a$, the distance between said side walls being equal to the diameter of the stem C at its grooved part $c$. The walls and shoulder of this said recess engage a portion of the valve-stem C when the parts are assembled, as will be hereinafter described. Formed on the lower end of the valve-stem C is an annular flange 4, of a thickness equal to the depth of the recess $a$ and of the same diameter as said recess. Above this flange is an annular groove $c$. The stem C also has a conical collar 5 formed thereon, whose base is equal in diameter to the diameter of the cylindrical head B. As a means for connecting the parts a malleable metal fastening-plate D is employed. This said plate has a recess $d$ therein to fit partly around the groove $c$ of the valve-stem C to lock the said stem to the disk valve A. Cut through the plate D near its outer edge is a tongue 6, which is adapted to be bent downwardly into an aperture 7, formed in the upper surface of the valve A.

In assembling the parts the flanged lower end of the valve-stem C is moved laterally within the slot 1 until it assumes a position concentric with the inner diameter of the cylindrical head B, when it is allowed to drop, whereby the flange 4 will fill the recess $a$ and the valve 5 will cover the entire upper surface of the said head B. The fastening-plate D is then placed within the slot 1 of the head B and over the flange 4 of the valve-stem C and having its recess $d$ in engagement with the annular groove 4, thus clamping the said stem between the recess of the cylindrical head and the recess of the fastening-plate, which plate is then effectually secured by bending the tongue 6 within the recess 7 of the cylindrical head B, as clearly shown by Fig. 5 of the drawings.

To disassemble the parts, the tongue 6 can be again bent into normal shape by forcing a thin instrument against its under surface, thus allowing the fastening-plate D to be readily removed.

In the modification illustrated by Figs. 3 and 4 the slot 1 is extended diametrically through the head B. To fasten the head of the valve to the stem in this case, I may use a malleable key or plate D', having the elongated prongs d' thereon, to pass through the slot 1. This key is secured in place by bending the free ends of the prongs d' over on the outer periphery of the head B after said key has been passed through the slot 1.

The disk valves A are each preferably supplied with an annular recess 8, having grooves 10 within each annular wall thereof. These recesses contain a filling 11 of a suitable compressed composition of matter adapted to act as a good valve-seat.

In use the device is employed in connection with a globe-valve casing E, having a conical seat f formed in its removable head F, through which the stem C is threaded, an annular valve-seat e being supplied for engaging the disk valve A.

The operations of the device are obvious, Fig. 5 of the drawings illustrating the relative arrangement thereof with the globe-valve structure, the screw-stem C engaging the head F, and the seating-surface of the disk valve A bearing upon the annular valve-seat e, showing the disk valve closed. When the valve is opened, the conical collar or valve 5 engages the seat f to prevent escape of steam around the valve-stem.

I do not claim, broadly, the use of a revoluble and detachable valve on a screw-stem, as I am aware that structures embodying these general features are not new; but my device has advantages over other structures known to me inasmuch as all the parts thereof fit snugly together when they are assembled, thus providing a valve and stem which are practically integral to withstand pressure and obviate buckling, but which revolve freely in relation to each other to facilitate the operation of the device.

Having thus described my invention, what I claim as new, and desire to secure by Letters Patent, is—

1. As a valve device, the combination, with a screw-stem having a conical collar, an annular groove and an annular flange on its lower end, of a valve having a circular recess in its upper surface to fit the said annular flange and a cylindrical extension having a slot leading through the base thereof and a recess in the top wall thereof, and a key within said slot and having a bifurcated end part engaging the said annular groove of the valve-stem whereby the valve may rotate on the stem, but lateral or vertical movement of the parts relatively with each other is prevented, substantially as shown and described.

2. As a valve device, the combination, with the screw-stem having the conical collar, annular groove and flange on its inner end, of the disk valve having the recess a and the concavity 7, in its upper surface and the cylindrical extension B, formed integral therewith and having a slot extended through its base and a recess through its head, and a malleable metal key embodying a plate having a bifurcated inner end to engage the said annular groove of the stem and a tongue to engage the said concavity 7, substantially as shown and described.

In testimony that I claim the foregoing as my invention I have signed my name, in presence of two witnesses, this 23d day of May, 1901.

ANDREW JOHN MURPHY.

Witnesses:
SOPHIA HARNISCH,
BELLE PATERSON.